Dec. 3, 1968    F. G. BURG    3,413,702
TURRET MACHINE HAVING TOOL STORE
Filed Oct. 4, 1965    11 Sheets-Sheet 1

INVENTOR.
FRED G. BURG
BY
Flam and Flam
ATTORNEYS.

Dec. 3, 1968  F. G. BURG  3,413,702
TURRET MACHINE HAVING TOOL STORE
Filed Oct. 4, 1965  11 Sheets-Sheet 2
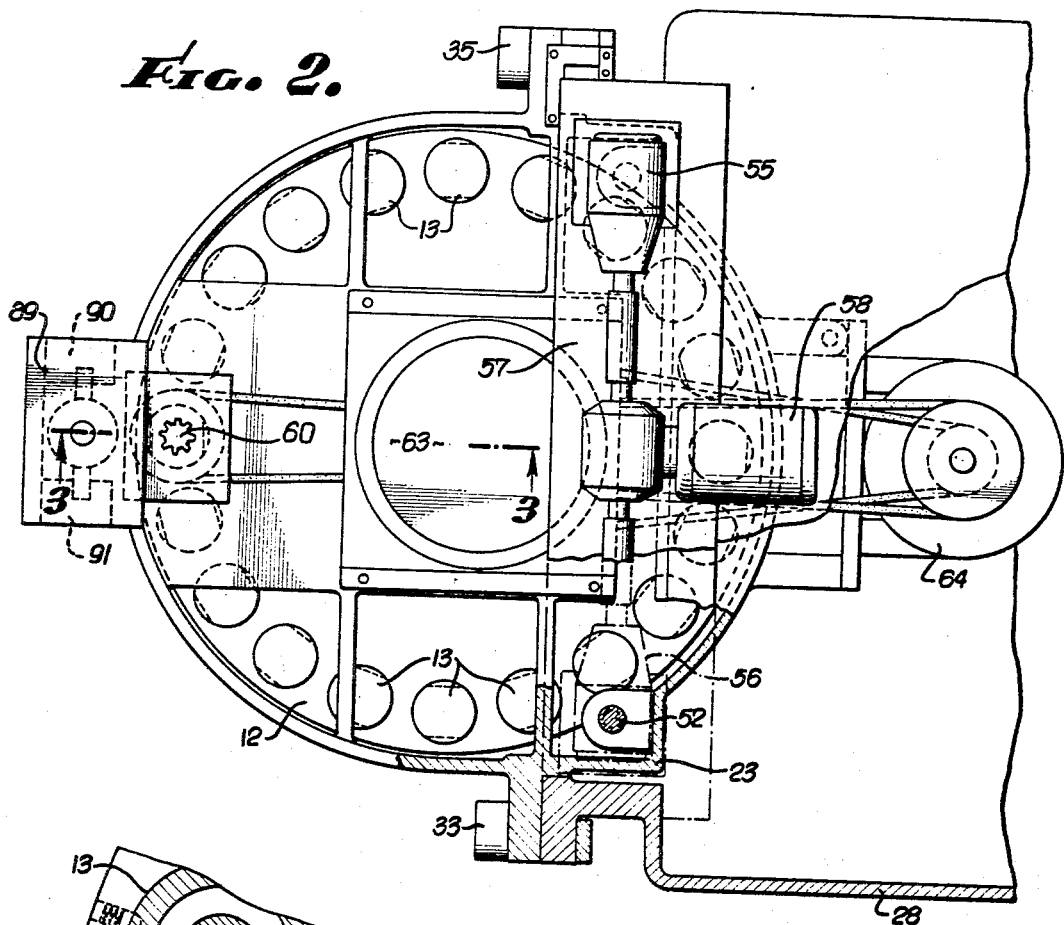
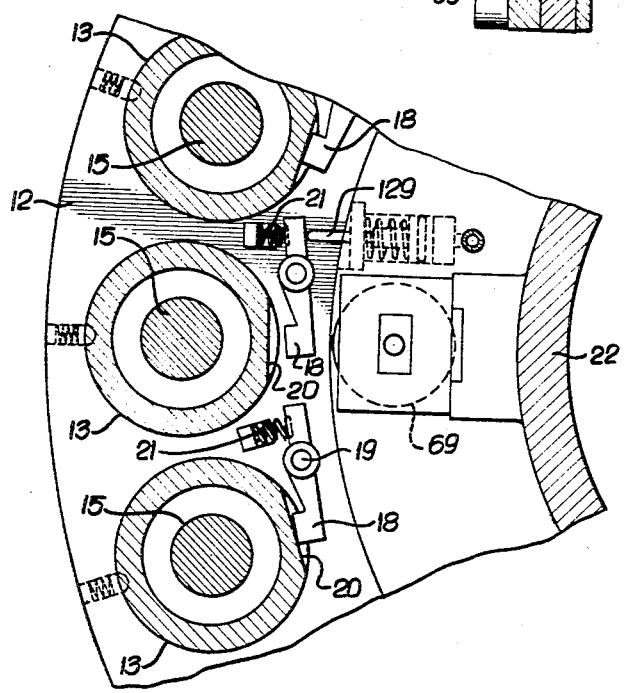
INVENTOR.
FRED G. BURG
BY
Flam and Flam
ATTORNEYS.

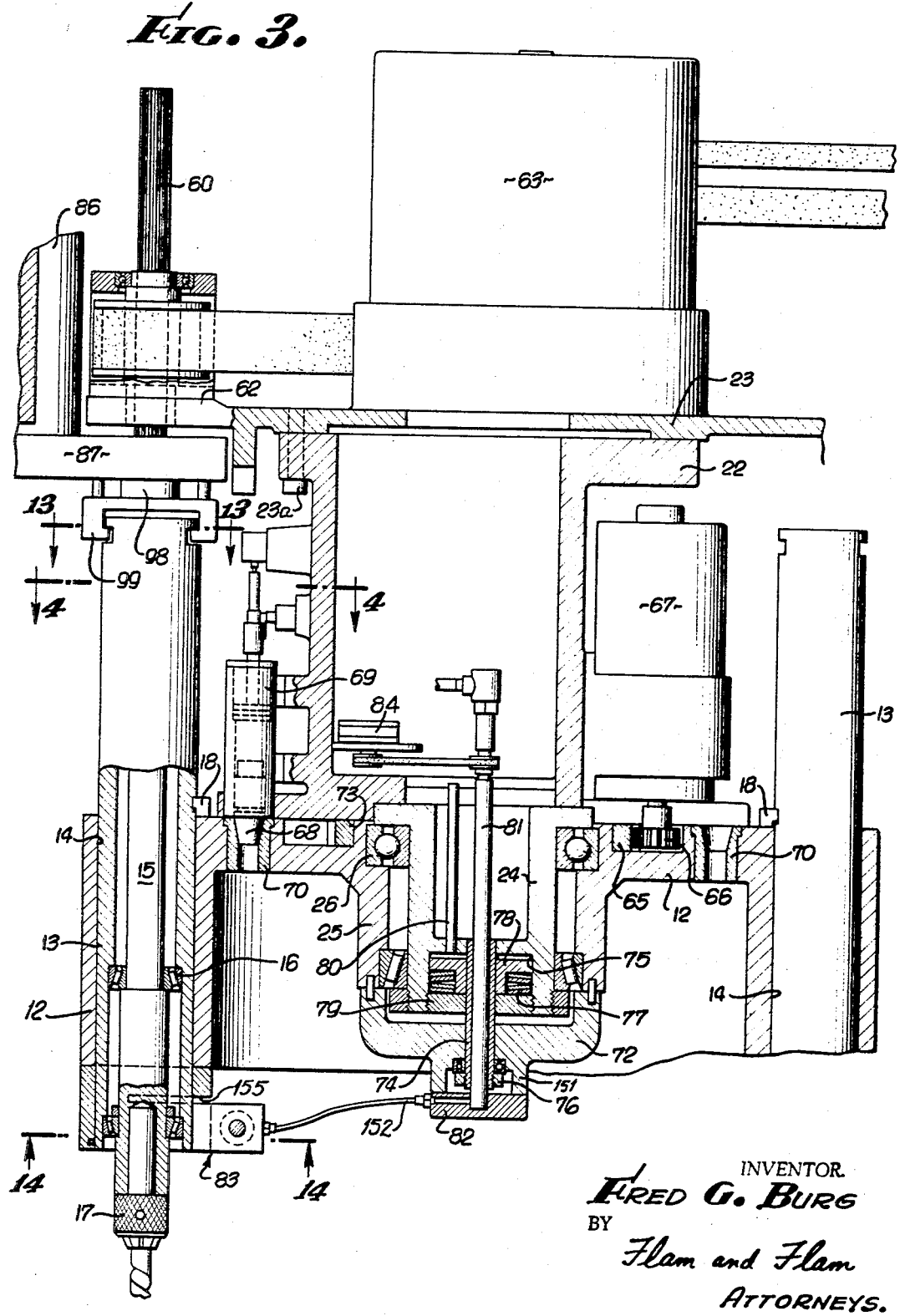

Dec. 3, 1968      F. G. BURG      3,413,702
TURRET MACHINE HAVING TOOL STORE
Filed Oct. 4, 1965      11 Sheets-Sheet 4

INVENTOR.
FRED G. BURG
BY
Flam and Flam
ATTORNEYS.

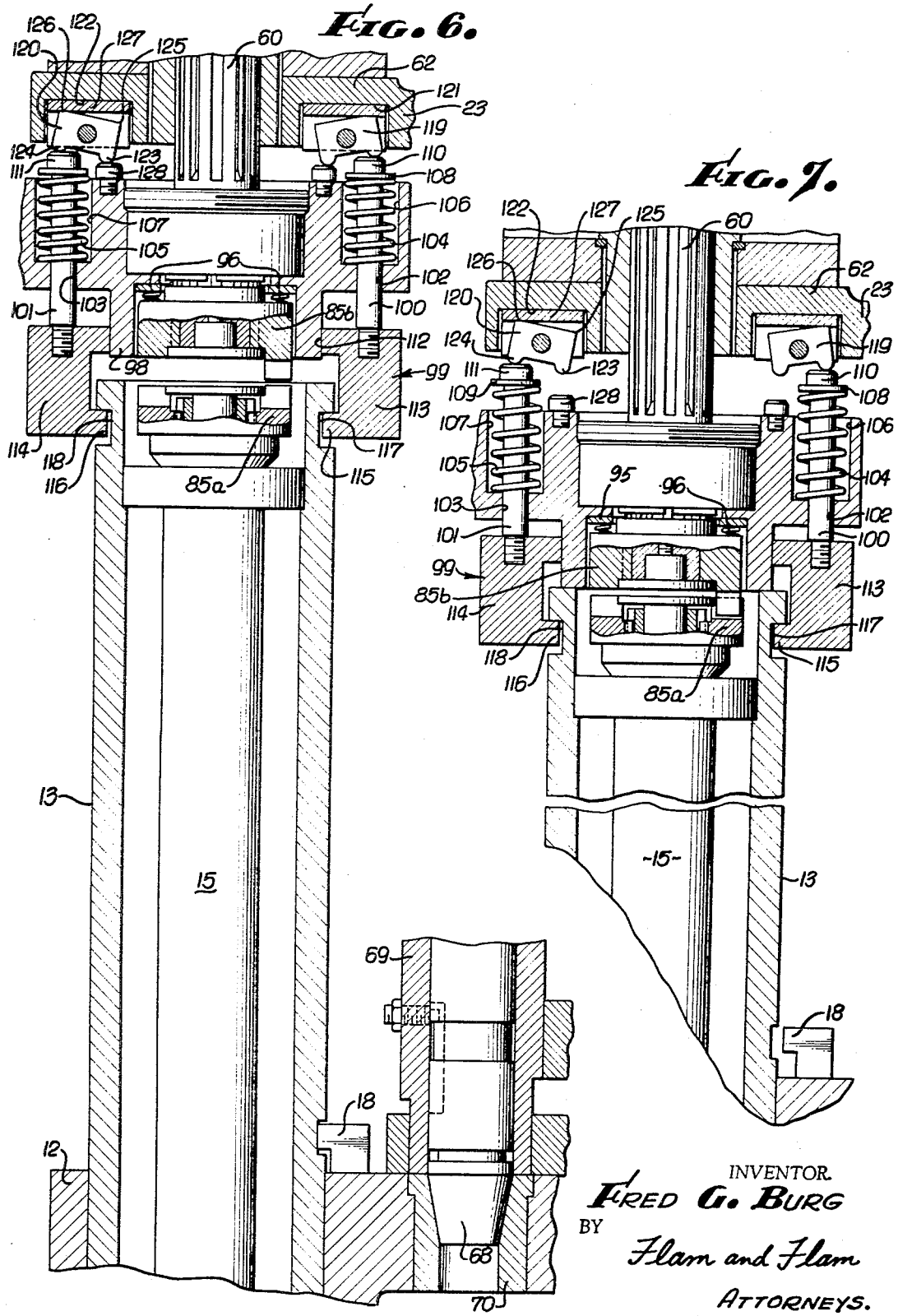

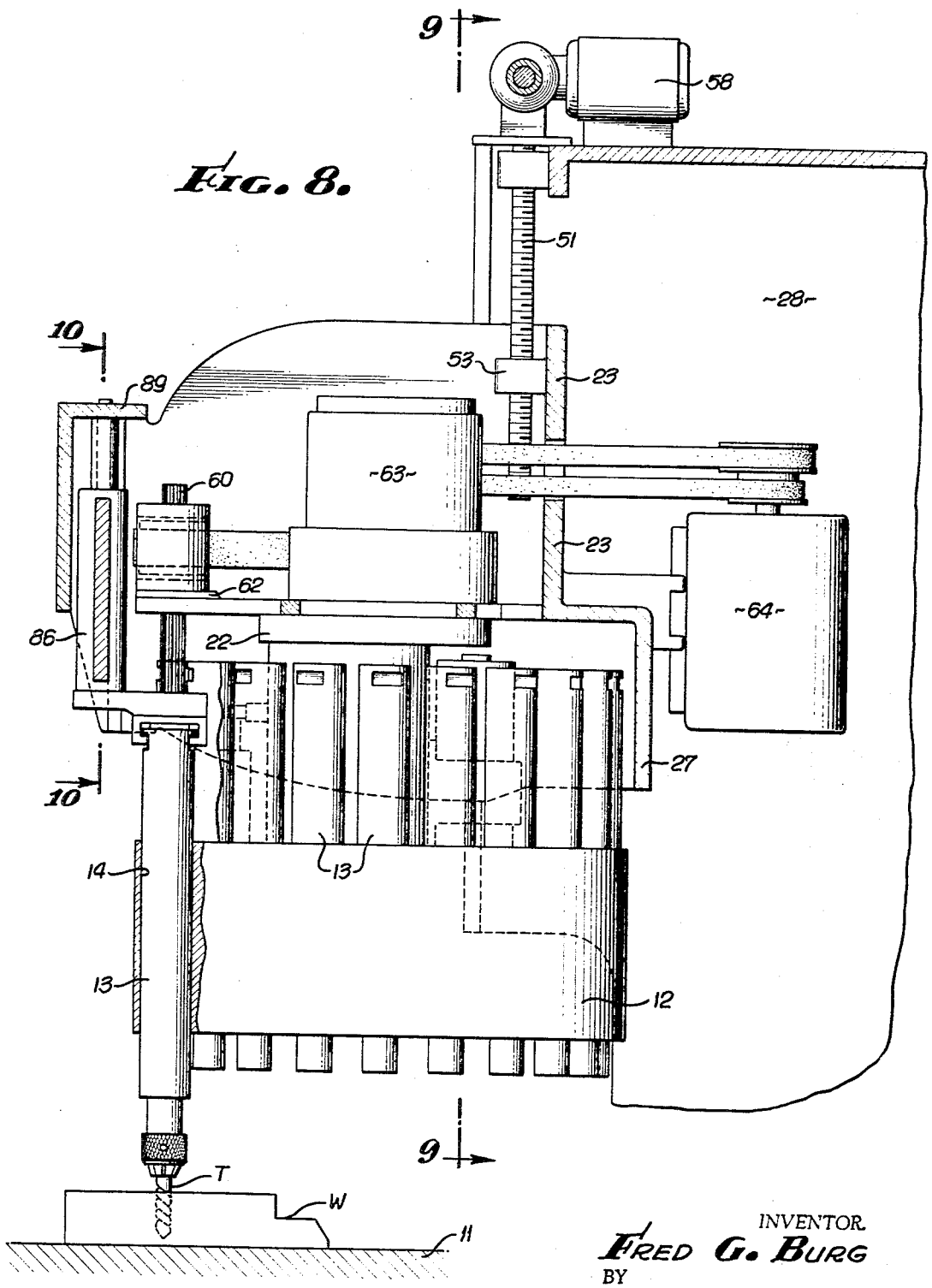

INVENTOR.
FRED G. BURG
BY
Flam and Flam
ATTORNEYS.

Dec. 3, 1968     F. G. BURG     3,413,702
TURRET MACHINE HAVING TOOL STORE
Filed Oct. 4, 1965     11 Sheets-Sheet 8
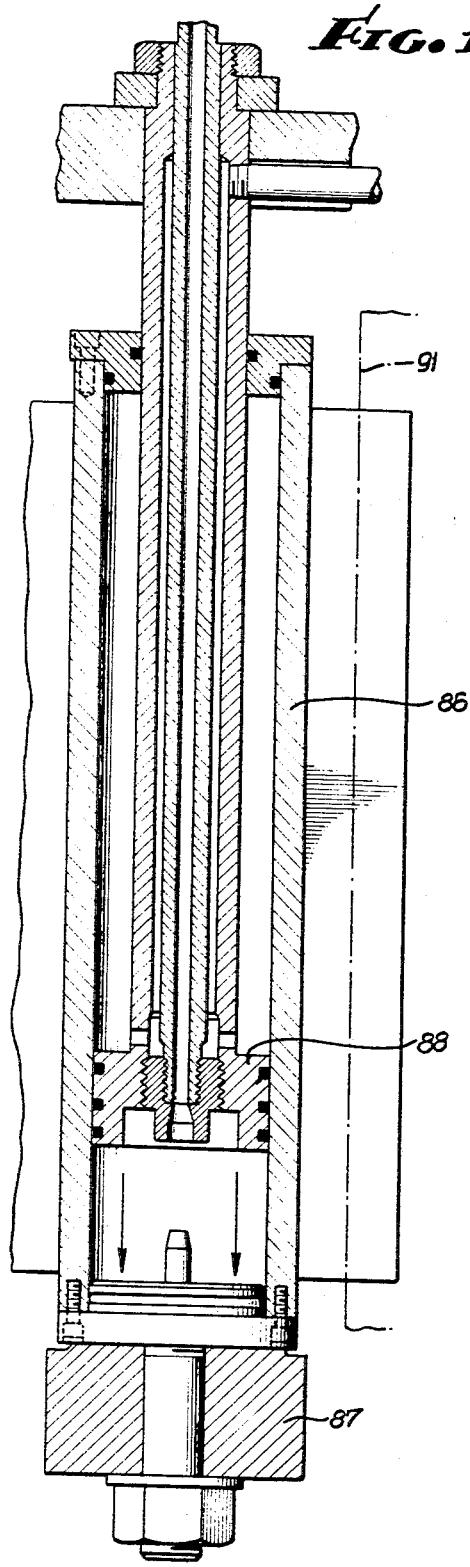
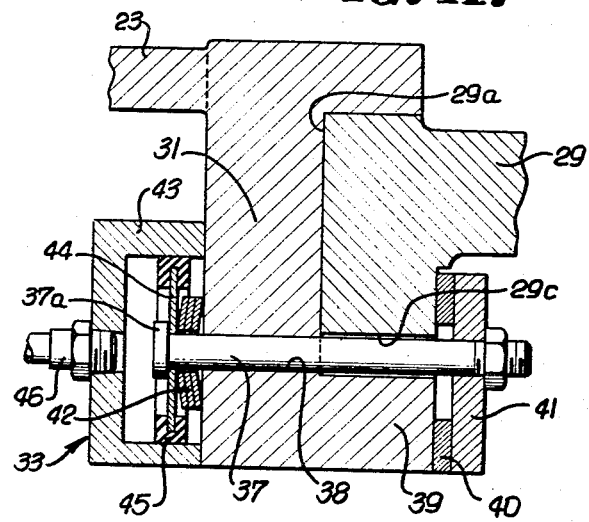
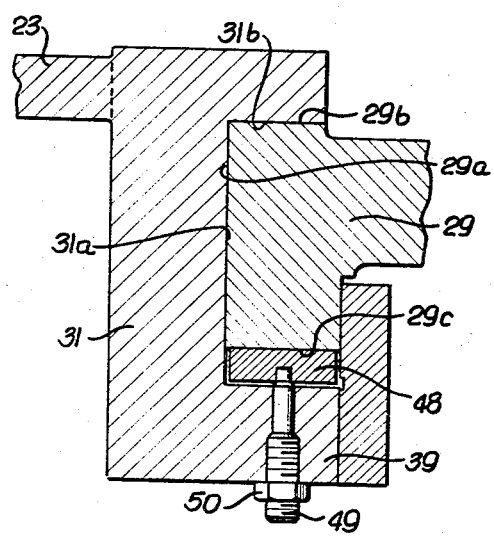
INVENTOR.
FRED G. BURG
BY Flam and Flam
ATTORNEYS.

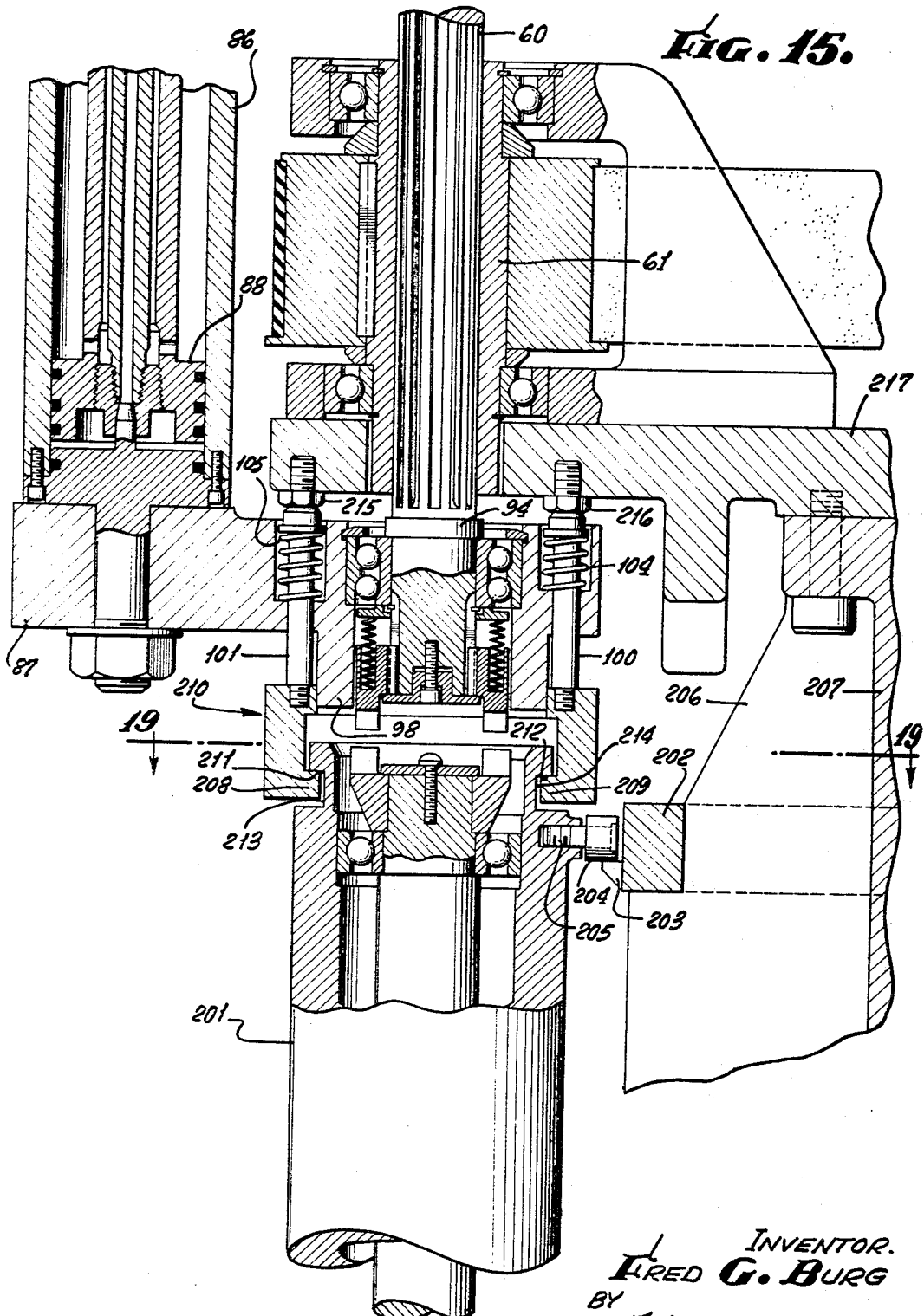

Dec. 3, 1968     F. G. BURG     3,413,702
TURRET MACHINE HAVING TOOL STORE
Filed Oct. 4, 1965     11 Sheets-Sheet 10

INVENTOR.
FRED G. BURG
BY Flam and Flam
ATTORNEYS.

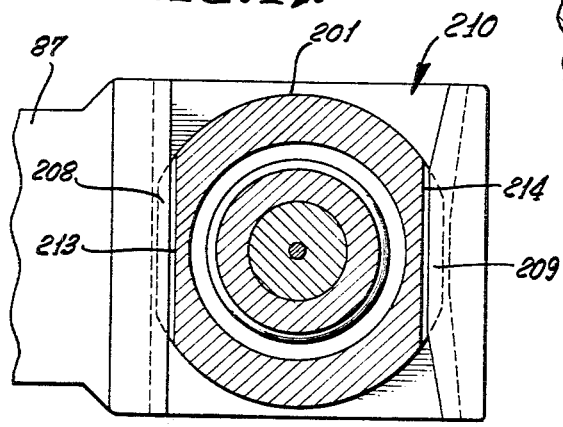
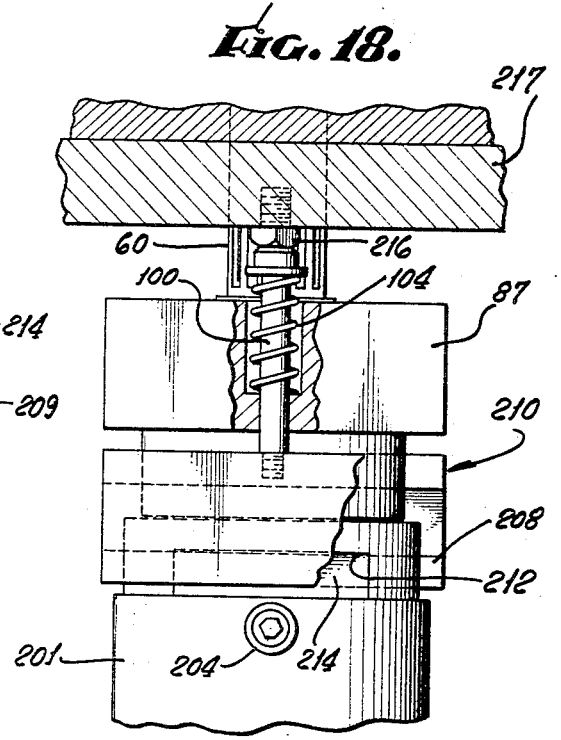
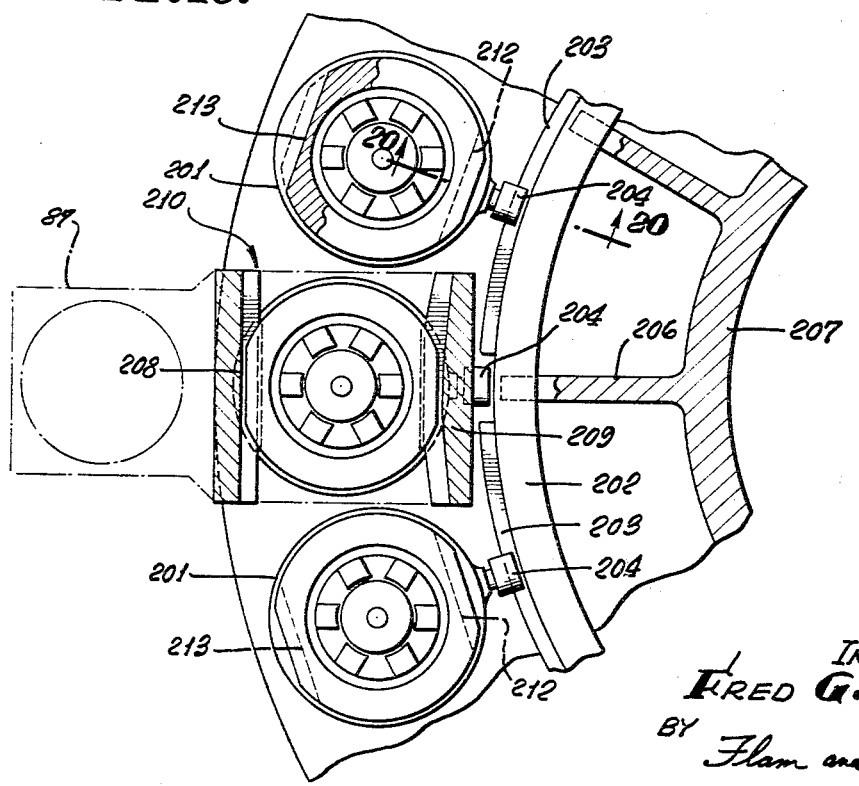

United States Patent Office 3,413,702
Patented Dec. 3, 1968

3,413,702
TURRET MACHINE HAVING TOOL STORE
Fred G. Burg, Los Angeles, Calif., assignor, by mesne assignments, to Houdaille Industries, Inc., Buffalo, N.Y., a corporation of Michigan
Continuation-in-part of application Ser. No. 435,972, Mar. 1, 1965. This application Oct. 4, 1965, Ser. No. 496,242
24 Claims. (Cl. 29—26)

ABSTRACT OF THE DISCLOSURE

A turret is rotatable about a vertical axis beneath the carriage that is vertically movable and supported on a frame, the turret having a series of quills that can be directly clamped one at a time to a vertically movable feed member. Such clamping also couples tool-supporting spindles through a clutch to a rotatably driven shaft. Other clamps lock the carriage to the frame, while a further clamp can lock a quill in its extended position. A still further clamp can lock the turret. Fluid actuators are used to release quill-restraining-means and to reciprocate the non-rotatable feed member.

---

This is a continuation-in-part of application Ser. No. 435,972, filed Mar. 1, 1965, and now abandoned.

This invention relates to a machine center providing a store of available tools for use in performing a variety of operations upon a workpiece, such as drilling, tapping, boring and milling.

More particularly this invention relates to a machining center of this character in which a substantial number of turret carried tool quills are individually movable with respect to the turret and whereby an extended feed movement of a selected tool may be accomplished without interference between the work and non-selected tools. The quills support spindles whereby the tool may be rotated.

Various devices have been proposed for coupling the quill and spindle respectively to a feed mechanism and a power shaft. One of the primary objects of this invention is to provide a simple, reliable mechanism for this purpose that utilizes as the operative element a simple unitary clamp element that moves only in the direction of feed. Another object of this invention is to provide a clamp that utilizes a pair of opposed lugs or rails through which companion parts of the quills are normally movable with clearance as the turret indexes, the lugs engaging the selected aligned quill to achieve the requisite couplings. Another object of this invention is to provide new and improved latching means for holding the quills in a normal retracted position, together with means for releasing the latch after the thrust of the quill is relieved from the latch.

Another object of this invention is to provide a simple reliable linkage system for imparting the requisite movement to the clamp automatically as a function of the simple rectilinear travel of the feed mechanism.

Another object of this invention is to control the quill latching mechanism as a function of the rectilinear travel of the feed mechanism whereby the latch is released after the clamp has engaged the quill.

Another object of this invention is to provide a side-by-side relationship between the power source for the feed mechanism and the axially movable power shaft, thus achieving a compact arrangement. A companion object of this invention is to provide a structural connection between the feed mechanism and the power shaft for axial movement of the latter that applies the axial thrust to the power shaft at a place close to its clutching element whereby the power shaft need not resist columnar type loads.

Another object of this invention is to provide a machining center of this character in which selection of tools and feed variables may be determined at random by numerical command.

Another object of this invention is to provide improved means for clamping the turret carriage to the frame.

Another object of this invention is to provide a track system for reliably holding the quills in a retracted position, but in which the weight of the selected quill is effectively transferred to the clamp before the quill is freed from the track. A companion object of this invention is to provide means for transmitting power to feed the quill which not only bypasses the track suspension means carried by the quill, but which also provides balanced thrust on opposite sides of the quill, ensuring against any tendency to bind.

This invention possesses many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the invention; but it is to be understood that this detailed description is not to be taken in a limiting sense, since the scope of this invention is best defined by the appended claims.

Referring to the drawings:

FIG. 2 is an enlarged fragmentary top plan view thereof, a portion of the apparatus being broken away and shown in section;

FIG. 3 is an enlarged fragmentary sectional view taken along the vertical plane indicated by line 3—3 of FIG. 2;

FIG. 4 (see sheet 2) is an enlarged fragmentary sectional view taken along the offset plane indicated by line 4—4 of FIG. 3;

FIGS. 6 and 7 are fragmentary sectional views showing portions of the apparatus illustrated in FIG. 5 but in different positions;

FIG. 8 is a fragmentary side elevational view similar to FIG. 1 but illustrating the operative quill in an advanced position;

Figure 14:
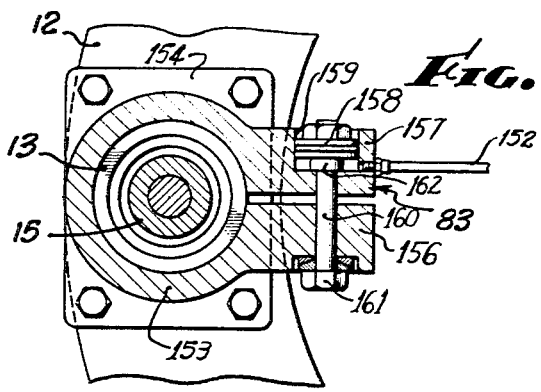
Figure 5:
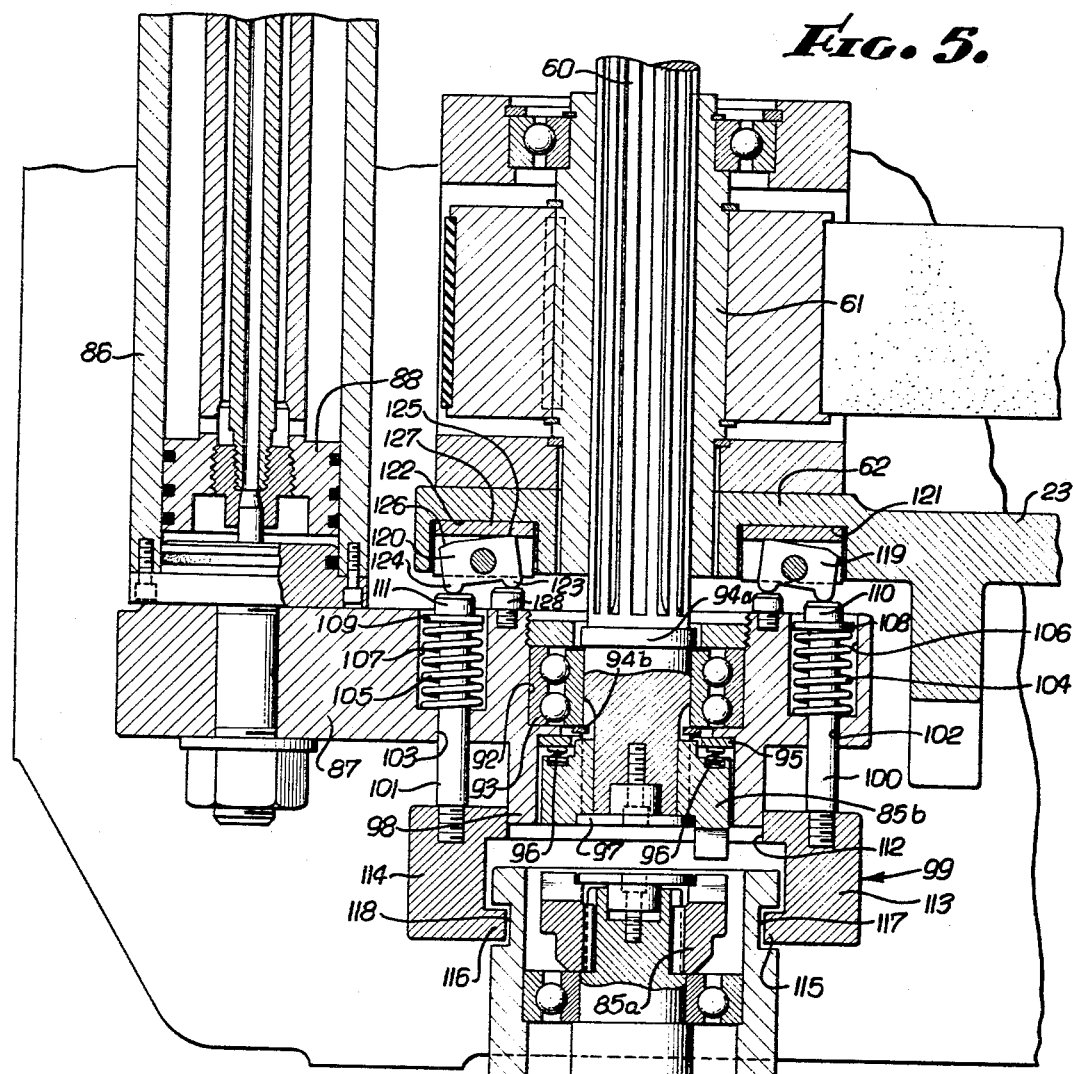
FIG. 5 is a fragmentary vertical sectional view showing in further detail a portion of the apparatus shown in FIG. 3.
Figure 13:
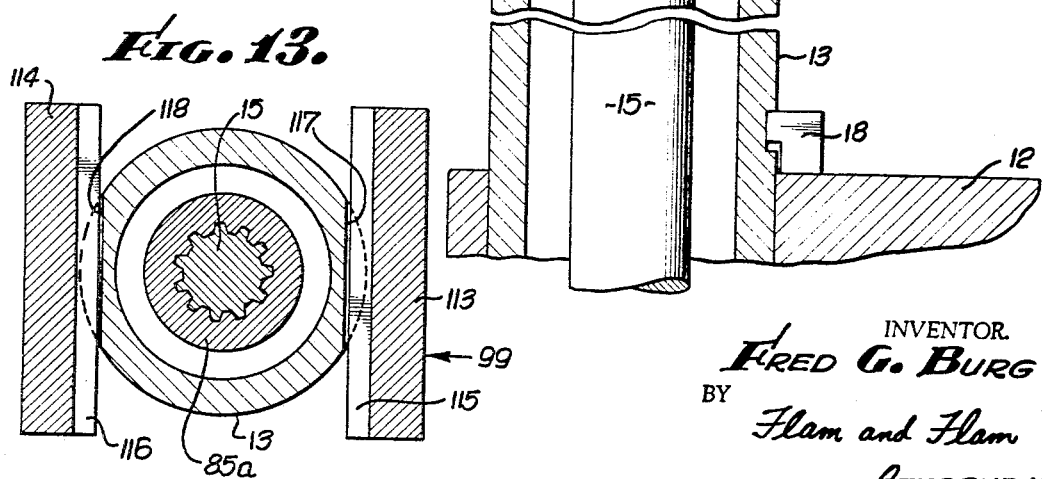
Figure 9:
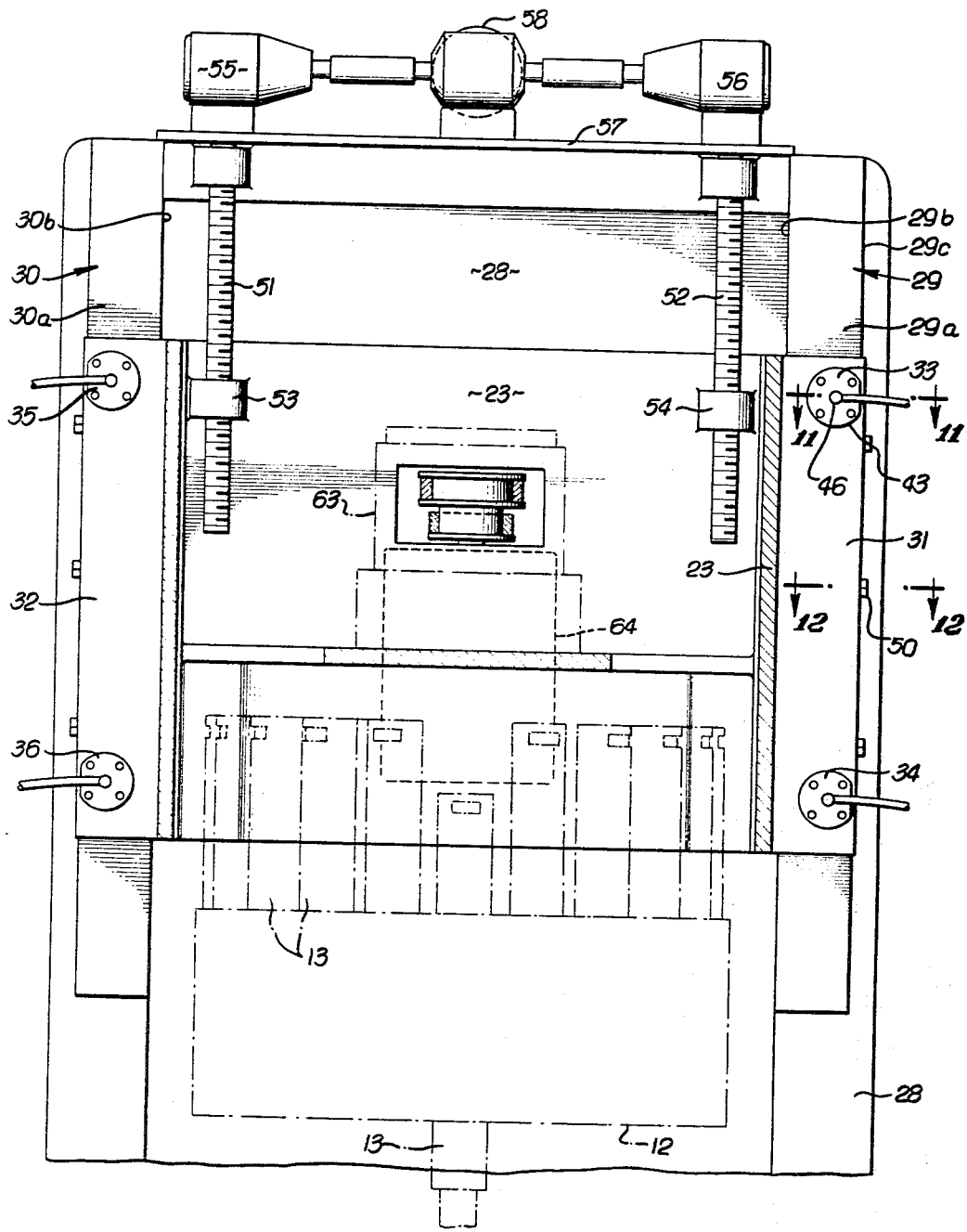

FIGS. 9 and 10 are sectional views taken along planes corresponding to lines 9—9 and 10—10 of FIG. 8;

FIGS. 11 and 12 are enlarged fragmentary sectional views taken along planes indicated by lines 11—11 and 12—12 of FIG. 9;

FIG. 13 (see sheet 4) is an enlarged sectional view taken along a plane corresponding to line 13—13 of FIG. 3;

FIG. 14 (see sheet 1) is a sectional view taken along a plane corresponding to line 14—14 of FIG. 3;

FIG. 15 is a sectional view similar to FIG. 5 and showing a modified form of this invention.

Figure 16:
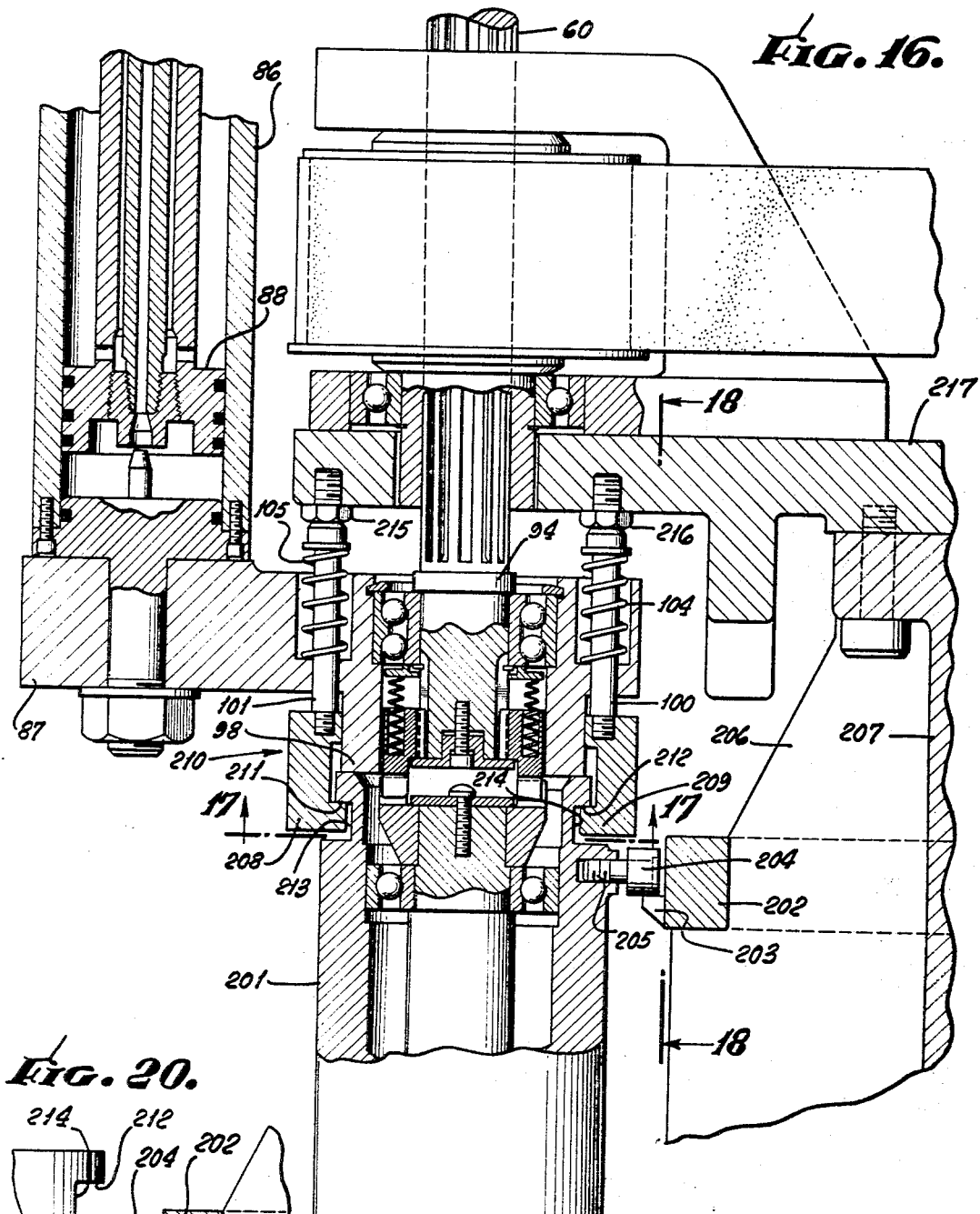
Figure 20:
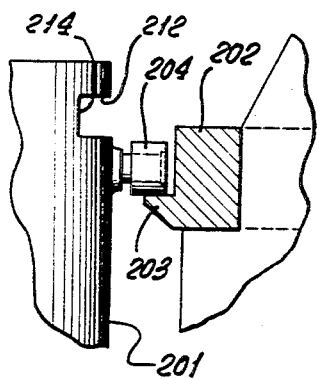

FIG. 16 is a sectional view similar to FIG. 15, but illustrating the slide in driving contact with the top of the quill;

FIGS. 17 and 18 are fragmentary sectional views taken along planes corresponding to lines 17—17 and 18—18 of FIG. 16;

FIG. 19 is a fragmentary sectional view taken along a plane corresponding to line 19—19 of FIG. 15; and FIG. 20 (see sheet 10) is a fragmentary sectional view taken along a plane corresponding to line 20—20 of FIG. 19.

Figure 1:
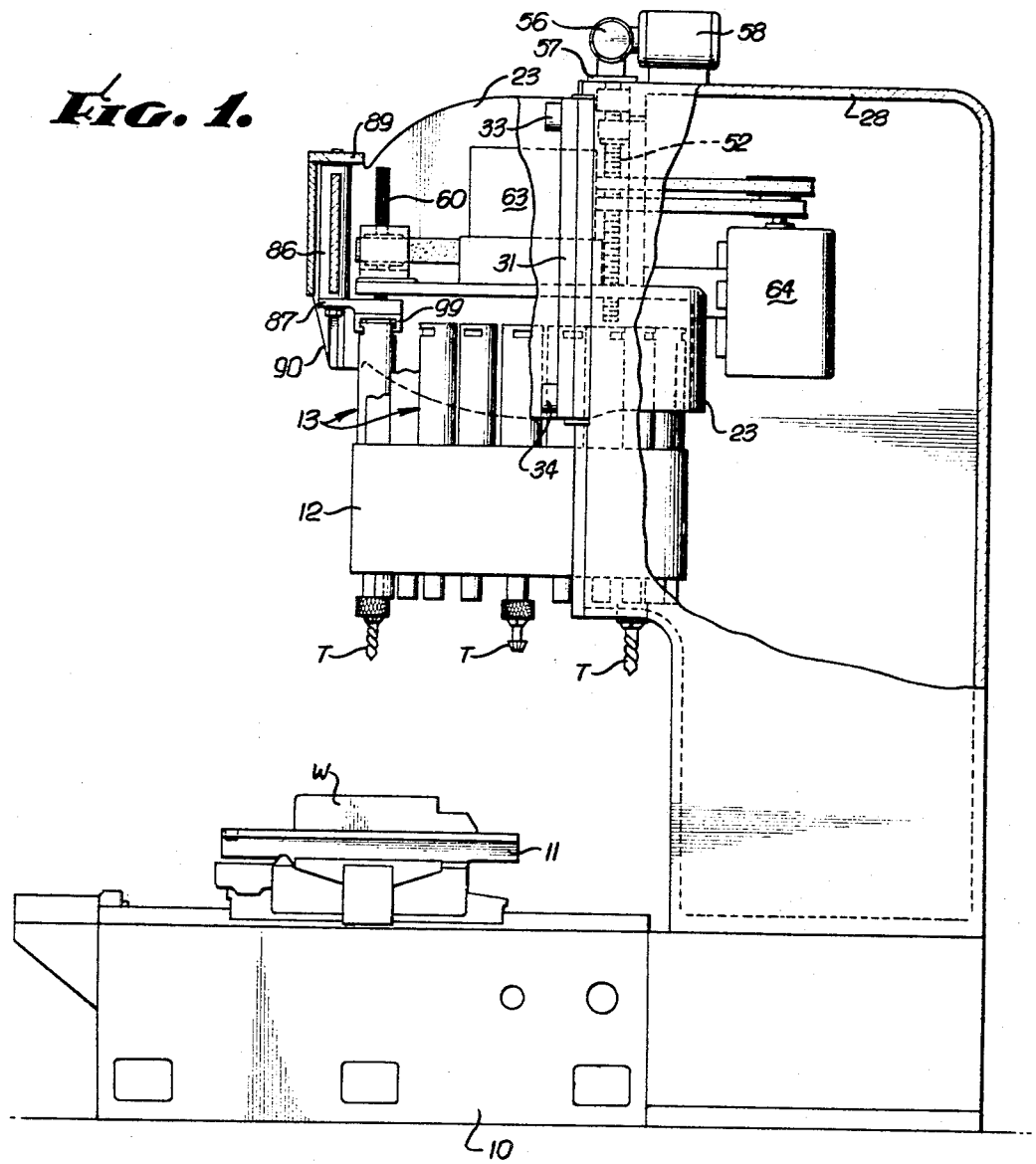
FIGURE 1 is a side elevational view of a machine tool incorporating my invention, a portion of the apparatus being broken away and shown in section.

The machine shown in FIG. 1 has a bed or base 10 upon which a work table 11 is supported. The table 11 is movable in a plane or two dimensional coordinate system. The work W may require a number of different machining operations, as for example drilling, tapping, boring or milling. In order to perform such functions, a number of different tools T are provided. These tools are mounted upon a turret 12 that is revolvable in both directions about an axis which, in this instance, is perpendicular to the bed or base 10.

As shown in FIGS. 3 and 8, the tools are individually supported by a set of quills 13. The quills are mounted for movement in rectilinear paths. In the present instance, these paths are all parallel to each other and to the turret axis. Each quill may be moved perpendicularly to the coordinate plane of the work table 11. In the present instance, twenty quills 13 are provided. The quills are slidably accommodated in vertical bores 14 located equiangularly about the turret axis. In order to support each tool T for rotation about its own axis a spindle 15 is mounted in each quill 13 by a number of bearings 16. The lower end of the spindle 15 carries a tool holder 17.

Each quill has a length substantially twice that of the bore 14 in which it is accommodated. Each quill 13 is releasably held in a retracted position by the aid of its own pivoted latching lever 18 (see also FIG. 4 on sheet 2). A pin 19 mounts each of the latching levers on the upper surface of the turret 12. One end of the latching lever 18 works in a transverse exterior slot or recess 20 of the quill 13. The upper shoulder of the slot 20 normally rests on the lever 18, but with the quill lifted, the lever is easily retracted. The weight of the quill 13 biases the quill to move in the feed direction. A small spring 21 actuates the lever 18. When the lever 18 for a selected quill is retracted (by means hereinafter to be described), the quill 13 may be advanced to the work.

The turret 12 (FIG. 3) is actually suspended from a hollow post 22 in turn suspended from a carriage 23 by bolts 23a. The turret projects radially beyond the post 22, and the upper ends of the quills 13 are normally arrayed around the post 22. Projecting downwardly from the post 22 is an axle or bracket 24. The turret has a central downwardly projecting hub 25, that telescopes over the bracket 24. A number of bearings 26 have parts respectively carried by the bracket 24 and the hub 25 whereby the turret 12 is revolvably mounted. The carriage 23 has a skirt 27 (FIG. 8) that surrounds the upper ends of the quills 13.

The carriage 23 is mounted for movement perpendicular to the bed 10 by a frame 28 (FIG. 1) that projects upwardly from the bed 10. The frame 28 has ways 29 and 30 (FIG. 9) cooperating with a pair of rails 31 and 32 on opposite sides of the carriage 23. The ways 29 and 30 have frontal surfaces 29a and 30a located in a common plane perpendicular to the bed 10. These surfaces contact surfaces as at 31a of the rails (FIG. 12). The ways 29 and 30 have inwardly returned surfaces 29b and 30b (FIG. 9). These inwardly returned surfaces, as for example the surface 29b (FIG. 12) contacts a surface 31b formed on the rail 31.

Each of the rails 31, 32 (FIG. 9) has a pair of upper and lower clamp structures 33, 34 and 35, 36. These clamp structures are all identical. One of them is shown in FIG. 11.

The clamp structure 33 includes a clamping rod 37 that is carried in an aperture 38 of the rail 31. The rod projects between the outer surface 29c of the way 29 and the opposed surface of a flange 39 of the rail 31. An end of the rod 37 carries a friction clamping pad 40 and a backing plate 41 engageable simultaneously with coplanar rear surfaces of the way 29 and the rail flange 39 thus to restrain relative movement. A series of Belleville springs 42 urge the rod 37 to apply the friction pad 40. These Belleville springs engage behind a head 37a of the rod 37 and contact the frontal surface of the rail 31. In order to release the clamping pad, rod 37 is moved to the right by a small hydraulic cylinder 43. This cylinder surrounds the headed end of the stem 37 and is attached to the frontal surface of the rail 31. A piston 44 is attached to the head 37a and carries a sealing ring 45 thus defining a cylinder space. The fluid is introduced through a fitting 46. Upon application of fluid pressure, the piston 44 and hence the rod 37 are caused to move to the right, releasing the normally applied friction pad 40.

In order to take up a lateral clearance between the rails and the ways each rail 31, 32 carries a series of shoes 48 between the upper and lower clamps. One such shoe is illustrated in FIG. 12. The shoe 48 is positioned by a threaded rod 49 so as to engage along the outer surface 29c of the way 29. A lock nut 50 secures the adjustment.

The carriage moves only slightly between clamped and unclamped position, and this movement is perpendicular to the way surfaces 29a and 30a. There is no tendency for the carriage to move laterally during this movement, as would be the case with tapered ways.

A pair of lead screws 51 and 52 (FIG. 9) serve to move the carriage 23 along the ways 29, 30. The lead screws 51 and 52 are in engagement with a pair of follower nuts 53 and 54. The screws 51 and 52 are driven by a pair of right angle drives 55 and 56 in turn mounted on a plate 57 that overhangs the top of the frame 28. The right angle drives are driven in unison through a motor 58.

In order to rotate a selected spindle, a splined shaft 60 (FIGS. 1, 2 and 3) is provided. This splined shaft 60 is mounted in a correspondingly splined sleeve 61 (FIG. 5) that is supported on a frontal ledge 62 of the carriage 23. The sleeve 61 and the shaft 60 are rotatable about an axis perpendicular to the bed 10 at a point within the coordinate plane of the work table 11. The shaft axis is spaced from and in this instance, parallel to the turret axis. The spacing between the axes of the splined shaft 60 and the turret 12 corresponds to the spacing between the axes of the several spindles 13 from the turret axis. Accordingly the spindles 13 may be brought into alignment beneath the splined shaft 60 for operation thereby.

In order to impart rotation to the splined shaft 60, a transmission 63 is provided that is mounted on top of the carriage 23. The transmission 63 (FIG. 8) is operated by a motor 64. In the present instance the motor 64, the transmission 63, and the splined sleeve 61 are interconnected by a system of timing or cog type belts. Adjustment of the transmission 63 and the excitation of the motor 64 will determine a variety of shaft speeds.

In order to move a selected spindle 15 into alignment with the splined shaft 60, the turret 12 is indexed. For this purpose the turret carries a ring gear 65 (FIG. 3) that is in turn operated by a pinion 66. A motor 67 carried by the carriage part or post 22 operates the pinion. In order accurately to locate the turret 12 to determine precise concentricity between the spindle 15 and the shaft 60, a tapered shot pin 68 is provided. This pin is operated by a hydraulic motor or actuator 69. The pin 68 cooperates with any one of twenty equiangularly located recesses of the turret 12. These recesses are formed by a series of hardened replaceable inserts 70 located in a circle just inwardly of the quill apertures bores 14. For control purposes, a sensing device such as a limit switch senses the position of the shot pin 68.

When the pin 68 determines precise concentricity, a cup-shaped clamp 72, located beneath the hub 25, holds the turret 12 firmly in position. The clamp 72 is carried for rotation with the turret and lifts the turret 12 so that it engages the flat under surface 73 of the turret bracket 22.

The clamp 72 is lifted by a hollow sleeve 74 that projects upwardly from the center of the clamp 72 and through a downwardly opening cylinder 75 formed at the end of the axle 24. This sleeve, which is relatively non-rotary, carries a nut 76 that transports upward thrust to the clamp 72 through a bearing. In order to move the sleeve 74 upwardly, a number of Belleville springs 77 are provided. These springs are accommodated in the cylinder space between a piston 78 secured to the sleeve 74 and a backing ring 79. Thus the Belleville springs 77 normally operate the clamp 72 by exerting an upward thrust on the sleeve 74. In order to release the clamp, hydraulic fluid is conducted into the cylinder 75 via a conduit 80. In response to application of fluid pressure, the piston 78 overpowers the springs 77 and the clamp 72 releases.

A number of similar clamps 83 and hydraulic actuators are provided for securing certain of the quills 13 against axial and lateral movement, such as may be necessary for milling operations. Several quills may be provided with such clamps. A pipe 81 for conducting hydraulic fluid for this purpose extends through the sleeve 74 and terminates in a distributor cap 82 attached to a flange 151 at the lower end of the clamp 72. Conduits, as at 152, radiate from the cap 82 and communicate with hydraulic actuators of the quill clamps 83.

Each quill clamp 83 (FIG. 14) is in the form of a split resilient ring 153 that surrounds the quill 13 at its place of emergence beneath the turret 12. The ring 153 is formed integrally with an attaching flange 154. However, in order to provide the requisite flexibility to the ring 153, a slot 155 (FIG. 3) extends inwardly to separate from the flange 154, that portion of the ring adjacent its split. The ring has opposed radial extensions 156 and 157 (FIG. 14) that may be drawn together by a piston 158. The piston 158 is mounted in a cylinder 159 in the extension 157. A piston rod 160, secured at one end to the piston, extends through both extensions and is attached at its other end to the extension 156, as by the aid of a nut 161. A collar 162 spaces the piston 158 above the bottom of the cylinder 159 where fluid under pressure may be admitted. When pressure is applied, the extensions 156 and 157 are drawn together and the quill is clamped. When pressure is released, the resilience of the split ring restores normal running clearance with respect to the quill 13.

The angular position of the pipe or conduit 81 (FIG. 3) also serves as a means for sensing the angular position of the turret 12. A potentiometer or selector or switch structure 84 accommodated in the central cavity of the post 22 is coupled to the pipe 81 and provides a remote signal corresponding to the position of the turret.

Each spindle 15 carries a clutch element as at 85a (FIG. 5) exposed at the upper end of the quill 13. The selected spindle is coupled to the splined shaft 60 by the aid of companion clutch element 85b splined to the shaft 60.

The splined shaft 60 is axially moved by a cylinder 86, a feed block 87 connecting the lower end of the cylinder to the shaft 60. The movable cylinder 86 surrounds a stationary piston structure 88. The top of the piston is attached to a frontal bracket 89 of the carriage 23 (FIG. 1). The cylinder 86 furthermore coacts with a pair of guide rails 90 and 91 as shown in FIG. 2 which define a path of movement parallel to the shaft axis.

The feed block 87 as shown in FIG. 5 is in its upper retracted position determined by a suitable stop formed by the bracket 89.

The feed block 87 projects beneath the overhanging ledge 62 of the carriage 23 and has a through-aperture 92 (FIG. 5) at which the lower end of the splined shaft 60 is located. A bearing structure 93 allows the splined shaft to be rotated while it is supported for axial movement. An intermediate shoulder 94a formed on the splined shaft and a washer 94b carried by the shaft lock the shaft to the bearing 93 whereby the shaft is coupled to the feed block 87.

The clutch element 85b is shielded in a cylindrical flange 98 extending downwardly from the block 87. The clutch element 85b has a limited axial movement with respect to the shaft 60 for smooth engagement with the clutch element 85a. A stop washer 97 at the end of the shaft 60 limits downward movement of the clutch element 85b. A number of springs 96 yieldingly urge the element 85b against the stop washer 97. A hardened backing plate 95 bears the thrust of the springs 96.

The aligned quill 13 is lifted in order to couple the clutch elements 85a and 85b and also to clamp the quill to the end surface of the cylindrical flange 98 for movement of the quill and feed block 87 in unison. For these purposes, a clamp 99 is provided. This clamp is suspended from the feed block 87 for limited axial movement by a plurality of posts, two of which 100 and 101 appear in FIG. 5. These posts project downwardly through guiding apertures 102, 103, etc., in the feed block 87. These apertures are located on opposite sides of the flange 98 and on opposite sides of the path of indexing movement of the quills. The lower ends of the posts are threadedly attached to the opposite sides of the clamp 99.

A plurality of compression springs 104, 105, etc., are accommodated in a series of upper enlargements 106, 107 of the feed block apertures. Through washers 108, 109, etc., the springs urge the heads 110, 111, etc., of the posts 100, 101 upwardly.

The clamp 99 is generally of inverted channel shape, the web or connecting portion having an aperture 112 that is piloted about the cylindrical depending flange 98 of the feed block 87. The side walls 113 and 114 of the channel shaped clamp 99 parallel the indexing path of the quills, and have inwardly projecting lugs or rails 115 and 116.

When the feed block 87 is fully retracted (FIG. 5) the clamp 99 is so positioned that a pair of milled flats 117 and 118 on opposite sides of the quills can pass with clearance between the rails 115 and 116. Thus the turret can be indexed. The position of the clamp is determined by a series of similar rockers 119, 120, etc., respectively cooperable with the posts 100, 101, etc. These rockers are pivotally mounted in generally radially extending slots 121, 122, etc., formed on the under surface of the carriage ledge 62.

The rocker 120, for example, has inner and outer depending lobes 123 and 124 that move in opposite axial directions upon angular movement of the rocker 120. The limits of angular movement are determined by alternate engagement of a pair of corners 125 and 126 of the rocker with a hardened backing plate 127 located in the bottom of the rocker slot.

When the feed block 87 is in its retracted position, a button 128 carried by the feed block engages the inner lobe 123 and moves the outer rocker lobe 124 downwardly. The head of the post 101 is engaged by the outer lobe 124, and thus moves the clamp 99 downwardly as the feed block terminates its upward movement. The other rockers are similarly operated. Thus in the retracted position of the feed block, the rails 115 and 116 are positioned to clear the quills.

The cycle is started by advancing movement of the feed block 87 with the turret locked in position. When the feed block 87 moves downwardly a distance corresponding to the stroke of the rockers (FIG. 6), the springs 104, 105, etc., move the clamp 99 upwardly, and slightly lift the aligned quill 13. Thrust on the latching lever 18 is removed. The lever now is automatically released, as by operation of a hydraulically operated actuator pin 129 (FIG. 4) mounted on the turret. The pin 129 may be controlled, for example, by a snap switch operated by the feed block 87. The rockers are now tilted inwardly, and the springs have sufficient unspent travel to stay in engagement with the post heads 110, 111 during further feed movement of the feed block 87.

Upon further advancing movement of the feed block, the cylindrical flange 98 moves toward and engages the top of the quill, as shown in FIG. 7. The clutch parts are engaged, and the tool spindle is rotated. The latch actuating pin 129 is released after the quill has moved downwardly a sufficient distance. The latch member then is in condition to reenter the recess 20 upon return movement of the quill.

The return movement of the feed block disconnects the clutch elements and lowers the quill on its latch member 18 in the reverse sequence of operations.

In the form illustrated in FIGS. 15 to 20, a modified form of quills 201 are held in a retracted position by the aid of a common rail 202 instead of individual latches. The rail 202 has a track in the form of a ledge or shoulder 203 (FIG. 19) that cooperates with a series of individual roller assemblies 204 carried by the quills 201. The roller assemblies each include a machine screw 205 by the aid of which the assemblies are attached to the side of the quill adjacent its upper end. The quills are restrained from angular movement, and hence the roller assemblies are oriented toward the axis of the turret.

The track or ledge 203, as shown in FIG. 19, is interrupted at a home position to allow the quill aligned with the feed mechanism to move downwardly.

The rail 202 is supported by a group of radial vanes 206 that project outwardly from a hollow post 207. The post 207 mounts the turret structure in the same manner as the hollow post 23 of the previous form.

The roller assembly 204 is confined between the quill and the vertical circumferential face of the rail 202. The screw 205 cannot be removed unless its quill is first longitudinally shifted with respect to the rail 202. A safety factor is thus provided, preventing accidental separation and consequent damage to the quill and the work.

Before the roller assembly 204 reaches the interrupted part of the ledge 203, a pair of downwardly facing shoulders 211 and 212, formed by a pair of milled flats 213 and 214, ride over a pair of rails 208 and 209 of an inverted clamp 210. The weight of the quill is thus smoothly transferred to the clamp structure. The position of the rails 208 and 209 at the retracted position of the clamp (FIG. 15) is very carefully controlled relative to the height of the abutment or shoulder 203, thus ensuring a smooth and effective transfer.

In the present instance, the clamp structure 210 has a simple arrested movement relative to the slide or feed block 87, rather than the compound movement of the previous form. This is possible since it is unnecessary to lift the quills 201 from latching projections. The slide or feed block 87 mounts the clamp 210 by the aid of posts 100 and 101, as in the previous form. These posts 100 and 101, in this instance, engage a number of fixed abutments 215 and 216 fastened to the under surface of the carriage 217. In the retracted position of FIG. 15, the abutments 215 and 216 have arrested the upward movement of the clamp 210 while the feed block 87 has moved upwardly subsequent to the arrest of movement of the clamp 210, bringing about a separation between the cylindrical flange 98 and the upper end of the quill. The springs 104 and 105 are compressed. In this position, the clamp is located to allow passage of quills therethrough.

In order to move the quill at the operating or home position downwardly, the hydraulic cylinder 86 is operated. The feed block 87 moves downwardly to the position illustrated in FIG. 16 to contact the upper end of the quill 201. The springs 104 and 105 have expanded, yet still exert a substantial force uring the clamp 210 upwardly and the circularly extending end surface of the quill 201 in firm contact with the cylindrical flange 98. The flange 98 imposes a balanced thrust upon the quill since it has a circularly extending surface for contacting the quill. Hence, there is no tendency for the quill to bind. At the same time, the roller assemblies 204 and their screws 205 need not bear any of the thrust necessary for feeding the quill downwardly. On continued movement of the slide or feed block 87 from the position illustrated in FIG. 16, the quill is downwardly moved.

In all other respects, the structure illustrated in FIGS. 15 to 20 is identical to the structure described in connection with the form of FIGS. 1 to 14.

The inventor claims:

1. In a machine tool: a turret; means mounting the turret for indexing movement about an axis; a plurality of quills; means individually mounting the quills on the turret for movement in rectilinear paths fixed with respect to the turret; restraining means for normally holding each of the quills in a retracted position; a common feed member located so as to be aligned with the quills in succession in accordance with the angular position of the turret; means mounting the feed member for movement in a path parallel to the aligned quill; a clam element having a pair of opposed rails fixed with respect to each other; each quill having parts for directly interfitting with the rails; means mounting the clamp element on a non-rotatable portion of the feed member for movement therebetween; a linkage operated by the feed member and locating the clamp element at one position relative to the feed member when the feed member is in a retracted position; said interfitting parts of said quills upon angular movement of the turret passing with clearance between said rails when the feed member is in said retracted position; spring means released and engaged by said linkage as the feed member begins and terminates its movement for moving the clamp member counter to that of the feed member to clamp the aligned quill directly to the feed member and to unclamp the quill from said feed member, respectively as the feed member begins and terminates its movement; said linkage comprising rocker mounted on a part with respect to which said feed member is movable and having one end in the path of return movement of the feed member, the other end being engageable with the clamp element and biasable by said spring means.

2. In a machine tool: a turret; means mounting the turret for indexing movement about an axis; a plurality of quills; means individually mounting the quills on the turret for movement in rectilinear paths fixed with respect to the turret; restraining means for normally holding each of the quills in a retracted position; a common feed member located so as to be aligned with the quills in succession in accordance with the angular position of the turret; means mounting the feed member for movement in a path parallel to the aligned quill; a clamp element having a pair of opposed rails fixed with respect to each other; each quill having parts for directly interfitting with the rails; means mounting the clamp element on a non-rotatable portion of the feed member for movement therebetween; a plurality of posts guided by the feed member and suspending the clamp element; spring means acting on the posts to urge the clamp element toward the feed member; a rocker for each post and mounted on a part with respect to which the feed member is movable, each rocker having one end in the path of retracting movement of the feed member, the other end of each rocker being in the path of the corresponding post; said interfitting parts of said quills upon angular movement of the turret, passing with clearance between the rails when the feed member is in said retracted position; the aligned quill being clamped by the clamp element directly against the non-rotatable portion of the feed member when the feed member is advanced as the spring means move their rockers.

3. In a machine tool: a support; a turret mounted on the support for indexing movement about an axis; a plurality of quills; spindles carried by the quills for rotation about axis fixed with respect to the quills; means individually mounting the quills on the turret for movement in rectilinear paths fixed with respect to the turret; restraining means for normally holding each quill in a retracted position; a shaft; means mounting the shaft on the support for rotation about its axis and for axial movement; means for transmitting rotary motion to said shaft; a non-rotatable feed member connected to said rotatable shaft; said quills being alignable in sequence with said shaft upon indexing movement of said turret whereby the path of movement of the aligned quill coincides with that of said shaft; a clamp non-rotatably carried by said non-rotatable feed member and extending on opposite sides of said rotatable shaft for clamping the quill endwise directly to the feed member; and a rotatable clutch part carried at one end of the shaft for being coupled to the aligned rotatable spindle in response to operation of said non-rotatably carried clamp.

4. In a machine tool: a turret; means mounting the turret for indexing movement about an axis; a plurality of quills; means individually mounting the quills on the turret for movement in rectilinear paths fixed with respect to the turret; the quills being movable from a normal retracted position to a position in which the quill projects from the turret; a split clamp ring carried by the turret and surrounding the quill at its place of emergence from the turret; and means for selectively constricting said clamp ring to lock said quill in any extended position.

5. In a machine tool: a turret; means mounting the turret for indexing movement about an axis; a plurality of quills; means individually mounting the quills on the turret for movement in rectilinear paths fixed with respect to the turret; the quills being movable from a normal retracted position to a position in which the quill projects from the turret; a split clamp ring carried by the turret and surrounding the quill at its place of emergence from the turret; spring means normally releasing the clamp ring; and hydraulic means for constricting said clamp ring to lock said quill in any extended position.

6. In a machine tool: a turret; means mounting the turret for indexing movement about an axis; a plurality of quills; means individually mounting the quills on the turret for movement in rectilinear paths fixed with respect to the turret; the quills being movable from a normal retracted position to a position in which the quill projects from the turret; a plurality of clamps carried by the turret for some of the quills, and respectively cooperable with the quills at their places of emergence from the turret for locking the associated quills in any extended position; a hydraulic distributor carried by the turret, a supply conduit carried by the turret at the axis of movement thereof for transmitting fluid under pressure to said distributor; spring means normally releasing said clamps; and hydraulic actuators supplied from said distributor for operating said clamps.

7. In a machine tool: a turret; means mounting the turret for indexing movement about an axis; a plurality of quills; means individually mounting the quills on the turret for movement in rectilinear paths fixed with respect to the turret; the quills being movable from a normal retracted position to a position in which the quill projects from the turret; a clamp member carried by the turret and movable in one direction to move the turret in the direction of the rotational axis of the turret to a locked position against its mounting means; spring means urging said clamp member to move in said one direction; and a hydraulic actuator for moving the clamp member in the other direction.

8. In a machine tool: a turret; means mounting the turret for indexing movement about an axis; a plurality of quills; means individually mounting the quills on the turret for movement in rectilinear paths fixed with respect to the turret; means biasing each quill for downward movement; companion latch members carried by the quills and the turret for releasably holding each quill in a retracted position; a common feed member alignable with the quills in succession in accordance with the angular position of the turret and movable in a path parallel to the aligned quill; means operative upon initial advancing movement of the feed member for acting directly on and moving the aligned quill in a direction opposite to said initial advancing movement of the feed member to disengage said latch members; and means operative upon further advancing movement of the feed member for moving the aligned quill and the feed member in unison.

9. In a machine tool: a turret; means mounting the turret for indexing movement about an axis; a plurality of vertical quills; means individually mounting the quills on the turret for movement in rectilinear paths fixed with respect to the turret; restraining means for normally holding each of the quills in a retracted position; a common feed member having a non-rotatable portion and located so as to be aligned with the quills in succession in accordance with the angular position of the turret; means mounting the feed member for movement in a path parallel to the aligned quill; a clamp element having a pair of horizontally spaced rails; means mounting the clamp element for vertical movement on the non-rotatable portion of the feed member; means vertically positioning the clamp element at one position relative to the feed member when the feed member is in a retracted position; opposite vertical sides of said quills upon angular movement of the turret passing between said rails when said feed member is in said retracted position; means for moving said rails vertically relative to the aligned quill to clamp the quill endwise directly to the non-rotatable portion of said feed member; and means for moving said feed member and the aligned quill in unison in their respective paths.

10. In a machine tool: a turret; means mounting the turret for indexing movement about an axis; a plurality of vertical quills; means individually mounting the quills on the turret fo movement in rectilinear paths fixed with respect to the turret; restraining means for normally holding each of the quills in a retracted position; a common feed member located so as to be aligned with the quills in succession in accordance with the angular position of the turret; means mounting the feed member for movement in a path parallel to the aligned quill; a clamp element having a pair of opposed rails fixed in horizontally spaced relation with respect to each other; each quill having parts on opposite vertical sides for interfitting directly with the rails; means mounting the clamp element for vertical movement on a non-rotatable portion of the feed member; means vertically positioning the clamp element at one position relative to the feed member when the feed member is in a retracted position; the opposite vertical sides of said quills upon angular movement of the turret passing between said rails when the feed member is in said retracted position; and means operated in response to initial movement of the feed member for moving the clamp element vertically both relative to the feed member and the aligned quill to directly engage the aligned quill and clamp it endwise to the feed member for movement of the feed member and quill in unison in their respective paths.

11. In a machine tool: a turret; means mounting the turret for indexing movement about an axis; a plurality of vertical quills; means individually mounting the quills on the turret for movement in rectilinear paths fixed with respect to the turret; restraining means for normally holding each of the quills in a retracted position; a common feed member located so as to be aligned with the quills in succession in accordance with the angular position of the turret; means mounting the feed member for movement in a path parallel to the aligned quill; a clamp element having a pair of opposed rails fixed in horizontally spaced relation with respect to each other; each quill having parts on opposite vertical sides for interfitting directly with the rails, means mounting the clamp element for vertical movement on a non-rotatable portion of the feed member; means vertically positioning the clamp element at one position relative to the feed member when the feed member is in a retracted position; the opposite vertical sides of said quills upon angular movement of the turret passing between said rails when the feed member is in said retracted position; and means operated in response to initial movement of the feed member for moving the clamp element vertically both relative to the feed member and the aligned quill to directly engage the aligned quill and clamp it endwise to the feed member for movement of the feed member and quill in unison in their respective paths; said means also moving the clamp element in the reverse direction to free the aligned quill at the terminus of return movement of said feed member.

12. In a machine tool: a turret; means mounting the turret for indexing movement about an axis; a plurality of vertical quills; means individually mounting the quills on the turret for movement in rectilinear paths fixed with respect to the turret; restraining means for normally holding each of the quills in a retracted position; a common feed member located so as to be aligned with the quills in succession in accordance with the angular position of the turret; means mounting the feed member for movement in a path parallel to the aligned quill; a clamp element having a pair of opposed rails fixed in horizontally spaced relation with respect to each other; each quill having parts on opposite vertical sides for interfitting directly with the rails; means mounting the clamp element for vertical movement on a non-rotatable portion of the feed member; means vertically positioning the clamp element at one position relative to the feed member when the feed member is in a retracted position; the opposite vertical sides of said quills upon angular movement of the turret passing between said rails when the feed member is in said retracted position; means operated in response to initial movement of the feed member for moving the clamp element vertically both relative to the feed member and the aligned quill to directly engage the aligned quill and clamp it endwise to the feed member for movement of the feed member and quill in unison in their respective paths; and means disposed adjacent to the turret for directly acting on and releasing the restraining means for the aligned quill following engagement of the clamp element with the aligned quill.

13. A combination as set forth in claim 12 in which said releasing means comprises an actuator common to the restraining means of the various quills and operative only on the restraining means of the then aligned quill.

14. In a machine tool: a turret; means mounting the turret for indexing movement about an axis; a plurality of vertical quills; means individually mounting the quills on the turret for movement in rectilinear paths fixed with respect to the turret; restraining means for normally holding each of the quills in a retracted position; a common feed member located so as to be aligned with the quills in succession in accordance with the angular position of the turret; means mounting the feed member for movement in a path parallel to the aligned quill; a clamp element having a pair of opposed rails fixed in horizontally spaced relation with respect to each other; each quill having parts on opposite vertical sides for interfitting directly with the rails; means mounting the clamp element for vertical movement on a non-rotatable portion of the feed member; a linkage operated by the feed members and vertically positioning the clamp element at one position relative to the feed member when the feed member is in a retracted position; the opposite vertical sides of said quills upon angular movement of the turret passing between said rails when the feed member is in said retracted position; spring means released and engaged by said linkage in response to the feed member beginning and terminating its movement for moving the clamp member vertically counter to that of the feed member to clamp the aligned quill endwise directly to the feed member and to unclamp the quill from said feed member, respectively as the feed member begins and terminates its movement.

15. In a machine tool: a support; a turret mounted on the support for indexing movement about an axis; a plurality of quills; spindles carried by the quills for rotation about axes fixed with respect to the quills; means individually mounting the quills on the turret fo movement in rectilinear paths fixed with respect to the turret; restraining means for normally holding each quill in a retracted position; a shaft; means mounting the shaft on the support for rotation about its axis and for axial movement; means for transmitting rotary motion to said shaft; a non-rotatable feed member connected to said rotatable shaft; said quills being alignable in sequence with said shaft upon indexing movement of said turret whereby the path of movement of the aligned quill coincides with that of said shaft; a clamp element non-rotatably movably mounted on the feed member and having rails on opposite sides of said shaft axis; means vertically positioning the clamp element and said rails at one position relative to the feed member when the feed member is in a retracted position; said quills upon angular movement of the turret passing freely between said rails when said feed member is in retracted position, and passing into alignment with one end of said shaft; means for operating the clamp upon initial movement of the feed member to clamp the aligned quill endwise directly to the non-rotatable feed member; and a clutch part carried at said shaft end for being coupled to the aligned spindle in response to operation of the clamp.

16. In a machine tool: a support; a turret mounted on the support for indexing movement about an axis; a plurality of quills; spindles carried by the quills for rotation about axes fixed with respect to the quills; means individually mounting the quills on the turret for movement in rectilinear paths fixed with respect to the turret; restraining means for normally holding each quill in a retracted position; a shaft; means mounting the shaft on the support for rotation about its axis and for axial movement; means for transmitting rotary motion to said shaft; a non-rotatable feed member connected to said rotatable shaft; said quills being alignable in sequence with said shaft upon indexing movement of said turret whereby the path of movement of the aligned quill coincides with that of said shaft; a clamp element non-rotatably movably mounted on the feed member and having rails on opposite sides of said shaft axis; means vertically positioning the clamp element and said rails at one position relative to the feed member when the feed member is in a retracted position; said quills upon angular movement of the turret passing freely between said rails when said feed member is in retracted position, and passing into alignment with one end of said shaft; means for operating the clamp upon initial movement of the feed member to clamp the aligned quill endwise directly to the nonrotatable feed member; and motive means carried by the support and located laterally of said shaft, and connected by said feed member to said shaft adjacent its said one end.

17. In a machine tool: a turret; means mounting the turret for indexing movement about an axis; a plurality of quills; means individually mounting the quills on the turret for movement in rectilinear paths fixed with respect to the turret; the quills being movable from a normal retracted position to a position in which the quill projects from the turret; and a releasable clamp carried by the turret, and through which clamp one of said quills is normally movable in its rectilinear path, for locking said one quill against lateral movement for any extended position of said one quill.

18. In a machine tool:
(a) a turret;
(b) a carriage mounting the turret for indexing movement about a vertical axis;
(c) a plurality of quills mounted on said turret for individual vertical movement;
(d) clamp means carried by the turret for moving the turret vertically to a locked position against said carriage;
(e) a pair of vertical rails on said carriage;
(f) a frame having a pair of vertical ways provided with forwardly facing surfaces lying in a common plane, said pair of ways respectively slidably engaged at said forwardly facing surfaces by said pair of rails; and
(g) a pair of spaced clamping devices carried by said carriage at each of said rails for moving the carriage and said rails horizontally to a locked position against said vertical ways.

19. A machine tool according to claim 18, wherein said vertical ways also have rearwardly facing surfaces parallel to said forwardly facing surfaces, said clamping devices acting between said vertically movable carriage and said rearwardly facing surfaces on said frame.

20. In a machine tool: a turret; means mounting the turret for indexing movement about an axis; a plurality of quills; means individually mounting the quills on the turret for movement in rectilinear paths fixed with respect to the turret; a stationary circular track interrupted at a home position; means carried by the quills and cooperating with the track for maintaining the quills in a retracted position; a non-rotatable feed member; rail means carried by the feed member and having upwardly directed surfaces at opposite sides of the quill for suspending the quill at the home position; said feed member and the quills having horizontal end surfaces directly engageable with each other to transfer only vertical feeding movement directly to the quill, said end surfaces extending substantially circularly about the axis of the quills, said surfaces being operative independently of said quill-carried means that cooperates with said track.

21. In a machine tool: a turret; means mounting the turret for indexing movement about an axis; a plurality of quills; means individually mounting the quills on the turret for movement in rectilinear paths fixed with respect to the turret; said quills having a pair of downwardly facing shoulders at opposite sides thereof; a non-rotatable feed member having a retracted position; horizontally spaced rail means carried by the feed member and positioned to receive said shoulders when said feed member is in a retracted position; and track means maintaining said quills in a retracted position, and interrupted at said feed member to transfer the load of the aligned quill to said rail means in response to rotation of said turret, said feed member transmitting thrust directly to an end surface of said quill independently of said track means.

22. In a machine tool: a turret; means mounting the turret for indexing movement about an axis; a plurality of quills, each of the quills having upper end surfaces and a pair of shoulders at opposite sides thereof and spaced from the said end surfaces and facing downwardly toward the opposite end of the quill; means individually mounting said quills on the turret for movement in rectilinear paths fixed with respect to the turret; track means maintaining said quills in a retracted position in said mounting means; a non-rotatable feed member mounted at a home position for advancing and retracting vertical movement; a clamp member on the non-rotatable feed member for relative substantially vertical movement with respect thereto; non-rotating spring means urging the clamp member in an upward direction; and abutment means arresting movement of said clamp member when said feed member approaches its upper retracted position, and storing energy in said spring means upon continued retracting movement of said feed member; said horizontally spaced rails, when said clamp member is arrested in its vertical movement, being vertically positioned to receive the downwardly facing shoulders of a quill moved into the home position; said track means being interrupted to transfer to said horizontally spaced rails the load of the aligned quill.

23. A machine tool as set forth in claim 22 in which said non-rotatable feed member has a downwardly facing surface engageable with the upper end surface of the aligned non-rotatable quill in response to advancing movement of said feed member.

24. In a machine tool: a turret; means mounting the turret for indexing movement about an axis; a plurality of quills having retracted positions; means individually mounting the quills on the turret in said retracted positions and for movement in rectilinear paths fixed with respect to the turret; a non-rotatable track extending substantially circularly about the said axis and having a cylindrical surface opposed to the retracted quills, said track also having an interrupted outwardly extending ledge; a roller assembly carried by each of the quills and having a part engaging the ledge, said cylindrical surface being opposed to the roller assemblies of the retracted quills and confining the roller assemblies against complete separating movement from the quills; said ledge being interrupted to enable one of the roller assemblies to pass through said ledge and hence to allow movement of the corresponding quill independently of said track and ledge in its said rectilinear path.

References Cited

UNITED STATES PATENTS

| | | | |
|---|---|---|---|
| 2,590,283 | 3/1952 | Weaver | 29—26 |
| 2,783,664 | 3/1957 | Johnson | 77—25 |
| 2,363,208 | 11/1944 | Sulzer | 83—71 |
| 2,748,864 | 6/1956 | Ewaldson | 83—524 |
| 3,124,017 | 3/1964 | Brainard | 29—1.5 |
| 3,203,017 | 8/1965 | Holzl | 77—25 |
| 2,957,393 | 10/1960 | Kampmeier | 90—11 |
| 3,244,028 | 4/1966 | Dever. | |

RICHARD H. EANES, JR., *Primary Examiner.*